(12) United States Patent
Oberhofer et al.

(10) Patent No.: US 11,275,727 B2
(45) Date of Patent: Mar. 15, 2022

(54) COMPOSITE VIEWS IN A MASTER DATA MANAGEMENT SYSTEM

(71) Applicant: INTERNATIONAL BUSINESS MACHINES CORPORATION, Armonk, NY (US)

(72) Inventors: Martin Oberhofer, Sindelfingen (DE); Jason Allen Woods, Round Rock, TX (US); Rin Davis, Austin, TX (US); Soma Shekar Naganna, Bangalore (IN); Pankuj Chachra, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 16/576,202

(22) Filed: Sep. 19, 2019

(65) Prior Publication Data

US 2021/0089520 A1 Mar. 25, 2021

(51) Int. Cl.
*G06F 17/00* (2019.01)
*G06F 16/23* (2019.01)
(Continued)

(52) U.S. Cl.
CPC ............ *G06F 16/2393* (2019.01); *G06F 9/54* (2013.01); *G06F 13/20* (2013.01); *G06F 16/212* (2019.01);
(Continued)

(58) Field of Classification Search
CPC ........ G06F 16/13; G06F 16/24; G06F 16/156; G06F 11/002; G06F 11/08; G06N 3/00; G06N 5/00; G05B 13/00
See application file for complete search history.

(56) References Cited

U.S. PATENT DOCUMENTS 7,730,097 B2 6/2010 Oswalt
8,195,698 B2 6/2012 Wasserman et al.
(Continued)

FOREIGN PATENT DOCUMENTS

WO 2018144409 8/2018

OTHER PUBLICATIONS

Loshin, "Evaluating master data management technology", https://tdwi.org/articles/2016/05/18/evaluating-master-data-management-technology.aspx, tdwi.org, May 18, 2016, 7 pages.
(Continued)

*Primary Examiner* — Hung D Le
(74) *Attorney, Agent, or Firm* — William Hartwell; Andrew D. Wright; Roberts Calderon Safran & Cole, P.C.

(57) ABSTRACT

A computer-implemented method includes determining, by a computer device, composite view rules for combining first data from a first data record and second data from a second data record to create a composite view of an entity in a master data management system; receiving, by the computer device, the first data; receiving, by the computer device, the second data; creating, by the computer device, the composite view from the first data and the second data based on the composite view rules; physically materializing the composite view on a storage device; preserving, by the computer device, the first data record; and preserving, by the computer device, the second data record.

25 Claims, 11 Drawing Sheets

(51) Int. Cl.
G06F 16/21 (2019.01)
G06F 13/20 (2006.01)
G06F 16/248 (2019.01)
G06F 16/242 (2019.01)
G06F 16/2457 (2019.01)
G06F 9/54 (2006.01)
G06F 16/25 (2019.01)

(52) U.S. Cl.
CPC ...... *G06F 16/2358* (2019.01); *G06F 16/2365* (2019.01); *G06F 16/243* (2019.01); *G06F 16/248* (2019.01); *G06F 16/24578* (2019.01); *G06F 16/252* (2019.01)

(56) References Cited

U.S. PATENT DOCUMENTS

| 9,298,727 | B2 | 3/2016 | Hazlewood et al. | |
| 9,760,603 | B2* | 9/2017 | Ebenstein | G06F 16/244 |
| 2009/0150498 | A1* | 6/2009 | Branda | G06Q 10/107 |
| | | | | 709/206 |
| 2011/0125741 | A1 | 5/2011 | Brobst | |
| 2013/0185353 | A1* | 7/2013 | Rondao Alface | H04N 21/25833 |
| | | | | 709/203 |
| 2015/0127672 | A1* | 5/2015 | Hazlewood | G06F 16/214 |
| | | | | 707/756 |
| 2015/0310064 | A1* | 10/2015 | Ebenstein | G06F 16/244 |
| | | | | 707/722 |
| 2015/0347111 | A1* | 12/2015 | Benari | G06F 11/3664 |
| | | | | 717/176 |
| 2021/0055885 | A1* | 2/2021 | Strathman | G06F 3/0604 |

OTHER PUBLICATIONS

Anonymous, "Customizing the hybrid MDM composite view", https://www.ibm.com/support/knowledgecenter/en/SSWSR9_11.3.0/com.ibm.swg.im.mdmhs.hybrid.setup.doc/topics/UsingCustomCompositeViewFunctionForHybrid.html, IBM Knowledge Center, accessed Sep. 17, 2019, 3 pages.

Mell et al., "The NIST Definition of Cloud Computing", NIST, Special Publication 800-145, Sep. 2011, 7 pages.

* cited by examiner

Data Quality Metrics

| | | Completeness | Format | Cardinality | Domain Compliance | Standardized | Address Verification | Total DQ Score (Configuration for the Composite Rule Suggestion Engine) | |
|---|---|---|---|---|---|---|---|---|---|
| Source 1 | First Name | 98% | 96% | 0.20000% | NA | N | NA | 1 * 0.98 + 1 * 0.96 + 1 * 0.002 + 1 * 0 + 1 * 0 + 1 * 0 = 1.942 | |
| | Last Name | 97% | 95% | 0.30000% | NA | N | NA | 1.923 | |
| | House Number | 100% | 100% | 0.01000% | NA | Y | Y | 4.0001 | * |
| Source 2 | First Name | 96% | 92% | 0.20000% | NA | N | NA | 1.882 | |
| | Last Name | 95% | 91% | 0.40000% | NA | N | NA | 1.864 | |
| | House Number | 99% | 97% | 0.10000% | NA | Y | NA | 2.961 | * |
| Source 3 | First Name | 95% | 91% | 0.15000% | NA | Y | NA | 2.8615 | * |
| | Middle Name | 30% | 89% | 0.00050% | NA | Y | NA | 2.1900005 | * |
| | Last Name | 97% | 90% | 0.40000% | NA | Y | NA | 2.874 | * |
| | House Number | 87% | 87% | 0.01000% | NA | N | N | 1.74 | |
| | Marital Status | 98% | 100% | 0.00005% | Y | N | NA | 2.9800005 | * |
| | Business email | 61% | 43% | 0.20000% | NA | N | NA | 1.042 | |
| | TAX ID | 100% | 100% | 100.00000% | NA | NA | NA | 3 | * |
| Source 4 | Name | 94% | 86% | 0.02000% | NA | N | NA | 1.8002 | |
| | House Number | 72% | 85% | 0.00500% | NA | N | N | 1.57005 | |
| | Marital Status | 98% | 94% | 0.00050% | N | N | NA | 1.920005 | |
| | Business email | 52% | 100% | 0.03000% | NA | NA | NA | 1.5203 | * |
| | Personal email | 43% | 100% | 0.03000% | NA | NA | NA | 1.4303 | * |

Total DQ Score = w1 * completeness + w2 * Format + w3 * Cardinality + w4 * Domain Compliance + w5 * Standardized + w6 * Verification
Assume w1 = w2 = w3 = w4 = w5 = w6 = 1, NA = 0, N = 0
* the highest DQ score for a particular source attribute
Minimal DQ Treshold for House Number = 4

FIG. 8

Mapping Map (Example)

| MDM Attribute | Source 1 | Source 2 | Source 3 | Source 4 | ... | ... | Source N |
|---|---|---|---|---|---|---|---|
| First Name | Y | Y | Y | Y | Y | Y | Y |
| Middle Name | N | Y | Y | N | N | N | N |
| Last Name | Y | Y | Y | Y | Y | Y | Y |
| Street Name | Y | Y | Y | Y | Y | Y | Y |
| House Number | Y | Y | Y | Y | Y | Y | Y |
| ZIP | Y | Y | Y | Y | Y | Y | Y |
| City | Y | Y | Y | Y | Y | Y | Y |
| Country | Y | Y | Y | Y | Y | Y | Y |
| TAX ID | N | Y | Y | N | N | N | N |
| Credit Score | N | N | Y | N | N | N | N |
| Business email | N | N | Y | Y | N | N | N |

FIG. 9

Mapping Map (Example) – After Ranking with DQ Scores

| MDM Attribute | Source 1 | Source 2 | Source 3 | Source 4 | ... | ... | Source N |
|---|---|---|---|---|---|---|---|
| First Name | 2 | 3 | 1 | 4 | ... | ... | ... |
| Middle Name | NA | 2 | 1 | NA | ... | ... | ... |
| Last Name | 2 | 3 | 1 | 4 | ... | ... | ... |
| Street Name | 1 | 2 | 3 | 4 | ... | ... | ... |
| House Number | 1 | too low | too low | too low | ... | ... | ... |
| ZIP | 1 | 4 | 3 | 2 | ... | ... | ... |
| City | 2 | 4 | 3 | 1 | ... | ... | ... |
| Country | 1 | 2 | 1 | 3 | ... | ... | ... |
| TAX ID | NA | 2 | 1 | NA | ... | ... | ... |
| Credit Score | NA | NA | 1 | NA | ... | ... | ... |
| Business email | NA | NA | 2 | 1 | ... | ... | ... |

FIG. 10

COMPOSITE VIEWS IN A MASTER DATA MANAGEMENT SYSTEM

BACKGROUND

Aspects of the present invention relate generally to data management and, more particularly, to creating a composite view of data that combines and compares data from multiple sources.

Master data management (MDM) systems with a physical MDM configuration where entities and their composite views are persisted (physically stored on a storage device) are considered physical MDM systems. Master data management (MDM) systems with a virtual MDM configuration where entities are persisted but without a composite view are considered virtual MDM systems. In virtual MDM systems, composite views of entities are computed in real-time and presented to a requester, but not physically stored within the MDM system.

Some physical MDM systems are primarily used in omni-channel solution architectures exposing a consistent master data to all touchpoints where a customer can interact with an enterprise. In this scenario, a customer, contact of an organization/supplier, etc., can create, update, and view a portion of the master data record. The master data record exposed is an entity where the attributes are physically materialized. In these physical MDM systems, updates happen only on the entity. The source records on initial load are matched and inactivated once the entity is produced. In physical MDM systems, once the source records are inactive, the source records cannot be updated.

Disadvantages of physical MDM systems include: many sources with different data models are forced into a single, common physical model; and once a collapse merging two or more source records is executed, it is very difficult to undo the merging with, for example, a split operation. In some case where third-party data is part of the merging, a problem can result if the third-party data must be deleted (for example, if a third-party data subscription is terminated), because it is very difficult to extract data from an entity after the merging.

Some virtual MDM systems are primarily used to derive, from source records, a composite view which is not persisted (physically materialized). In these virtual MDM systems, creating and updating happens at the source record level only. The entity's composite view can change between two subsequent read operations due to a subsequent matching operation. This potential change in the entity view can be confusing to a user. As a result of the potential confusion, virtual MDM systems are difficult to use as a single source of truth when editing of that single source of truth is required. However, virtual MDM systems are suitable in some scenarios such as, for example, healthcare where a healthcare insurer (client) receives patient information from hospital systems, doctor systems, etc., which are outside of the control of the operator of the MDM system, and the client requires a view showing the most updated data.

Disadvantages of virtual MDM systems include: a virtual MDM system is practically unusable for omni-channel architectures that need to be able to update an entity directly instead of updating one or more of the entity's source records; and computation of the virtual entity's composite view at runtime makes retrieval typically slower in comparison to a physical MDM system where the entity is simply retrieved by an identifier.

There is a need for an MDM system that has the speed advantage of a physical MDM system as well as the source-level updating advantage of a virtual MDM system. Such a system would eliminate the above disadvantages of each type of system described above.

SUMMARY

In a first aspect of the invention, there is a computer-implemented method including determining, by a computer device, composite view rules for combining first data from a first data record and second data from a second data record to create a composite view of an entity in a master data management system. The computer device receives the first data and the second data. The computer device creates the composite view from the first data and the second data based on the composite view rules. The computer device physically materializes the composite view on a storage device, preserves the first data record, and preserves the second data record.

Embodiments of the invention provide a technical solution to the technical problem of providing a method of creating a composite view in an MDM system having the speed advantage of a physical MDM system as well as the source-level updating capability of a virtual MDM system. Examples of this technical solution include an entity's composite views being persisted (physically materialized) while also maintaining the source records intact and updatable (as opposed to being inactivated in a physical MDM system).

In an advantageous embodiment, in determining the composite view rules, the computer device defines initial composite rules based on a governance catalog. In determining the composite view rules, the computer device receives composite rule edits to the initial composite rules, the composite rule edits being inputted by a user. In determining the composite view rules, the computer device edits one or more of the initial composite rules in accordance with the composite rule edits to create edited composite rules. In determining the composite view rules, the computer device receives, in response to the editing, approval from the user of the edited composite rules. In determining the composite view rules, the computer device receives approval from the user of unedited ones of the initial composite rules. In determining the composite view rules, the computer device establishes the approved edited composite rules and the approved initial composite rules as the composite view rules.

Advantageous embodiments of the invention provide a technical solution to the technical problem of editing the rules used to produce a view in an MDM system. Embodiments of the invention provide a solution to this problem by allowing a user to review initial composite rules based on a governance catalog, and edit one or more of the initial composite rules to tailor the composite view rules as needed to produce the composite view desired by the user.

In another aspect of the invention, there is a computer program product including a computer readable storage medium having program instructions embodied therewith. The program instructions are executable by a computing device to cause the computing device to determine composite view rules for combining first data from a first data record and second data from a second data record to create a composite view of an entity in a master data management system. The program instructions are executable by the computing device to cause the computing device to receive the first data and receive the second data. The program instructions are executable by the computing device to cause the computing device to create the composite view from the first data and the second data based on the composite view rules. The program instructions are executable by the computing device to cause the computing device to physically materialize the composite view on a storage device, preserve the first data record, and preserve the second data record.

Embodiments of the invention provide a technical solution to the technical problem of providing a computer program product that creates a composite view in an MDM system having the speed advantage of a physical MDM system as well as the source-level updating capability of a virtual MDM system. Examples of this technical solution include an entity's composite views being persisted (physically materialized) while also maintaining the source records intact and updatable (as opposed to being inactivated in a physical MDM system).

In an advantageous embodiment, the computer program product includes program instructions executable by the computing device to determine that a change to the entity corresponds to the first data record, and propagate the change to the entity back to the first data record.

Advantageous embodiments of the invention provide a technical solution to the technical problem of updating source records with update information applied to an entity in an MDM system that physically materializes the entity's composite view.

In another aspect of the invention, there is system including a processor, a computer readable memory, and a computer readable storage medium. The system includes program instructions to determine composite view rules for combining first data from a first data record and second data from a second data record to create a composite view in a master data management system. The system includes program instructions to receive the first data, and to receive the second data. The system includes program instructions to create the composite view from the first data and the second data based on the composite view rules. The system includes program instructions to materialize the composite view on a storage device, to preserve the first data record, and to preserve the second data record. The program instructions are stored on the computer readable storage medium for execution by the processor via the computer readable memory.

Embodiments of the invention provide a technical solution to the technical problem of providing a system that creates a composite view in an MDM system having the speed advantage of a physical MDM system as well as the source-level updating capability of a virtual MDM system. Examples of this technical solution include an entity's composite views being persisted (physically materialized) while also maintaining the source records intact and updatable (as opposed to being inactivated in a physical MDM system).

In an advantageous embodiment, the system includes program instructions to receive a change to the first data record, and update the composite view to reflect the change to the first data record.

Advantageous embodiments of the invention provide a technical solution to the technical problem of updating a physically materialized composite view with update information applied to source records in an MDM system that physically materializes the composite view.

In another aspect of the invention, there is a computer-implemented method including defining, by a computer device, initial composite rules based on a governance catalog. The computer device receives composite rule edits to the initial composite rules, the composite rule edits being input by a user. The computer device edits one or more of the initial composite rules in accordance with the composite rule edits to create edited composite rules. The computer device receives, in response to the editing, approval from the user of the edited composite rules. The computer device receives approval from the user of unedited ones of the initial composite rules. The computer device receives source data records from two different data sources. The computer device composes a composite view in a master data management system by applying the edited composite rules and unedited ones of the initial composite rules to data from the source data records. The computer device physically materializes the composite view on a storage device and preserves the source data records.

Embodiments of the invention provide a technical solution to the technical problem of providing a method of composing a view including data from the composite data record in an MDM system having the speed advantage of a physical MDM system as well as the source-level updating capability of a virtual MDM system. Examples of this technical solution include an entity's composite views being persisted (physically materialized) while also maintaining the source records intact and updatable (as opposed to being inactivated in a physical MDM system).

In an advantageous embodiment, the governance catalog includes data quality metrics, regulatory metrics, metadata of the different data sources, and/or data access policies.

Advantageous embodiments of the invention provide a technical solution to the technical problem of determining what data (attributes) from a plurality of source records related to an entity is used to create or edit the entity. Embodiments use one or more of data quality metrics, regulatory metrics, metadata of the different data sources, and data access policies to compare attributes in the source records to determine a selected value for each of the attributes to include in the entity's composite view.

In another aspect of the invention, there is a computer-implemented method including suggesting, by a computer device, proposed composite rules for a master data management (MDM) system. The computer device edits the proposed composite rules for the MDM system. The computer device retrieves a list of sources attached to the MDM system from a governance catalog. The computer device retrieves an MDM model from the governance catalog, the MDM model having semantically classified attributes. The computer device creates a mapping map in accordance with a matching algorithm, the matching algorithm determining a linked source attribute for each of the semantically classified attributes in the MDM model where there is an attribute from the sources with a same semantical classification. The computer device computes, using the mapping map, a data quality score for each linked source attribute. The computer device ranks the linked source attributes based on the data quality scores. The computer device retrieves data access policies from the governance catalog. The computer device determines composite rules based on the data access policies. The computer device deploys the composite rules for use in producing composite views in the MDM system. The computer device physically materializes the composite record. The computer device preserves the sources on the list of sources.

Embodiments of the invention provide a technical solution to the technical problem of providing a method of creating a composite view of a composite record in an MDM system having the speed advantage of a physical MDM system as well as the source-level updating capability of a virtual MDM system. Examples of this technical solution include an entity's composite views being persisted (physically materialized) while also maintaining the source records intact and updatable (as opposed to being inactivated in a physical MDM system).

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 8 shows an example of data quality metrics from a guidance catalog in accordance with aspects of the invention.

FIG. 9 shows an example of a mapping map in accordance with aspects of the invention.

FIG. 10 shows an example of a mapping map after ranking with data quality scores in accordance with aspects of the invention.

DETAILED DESCRIPTION

Figure 1:
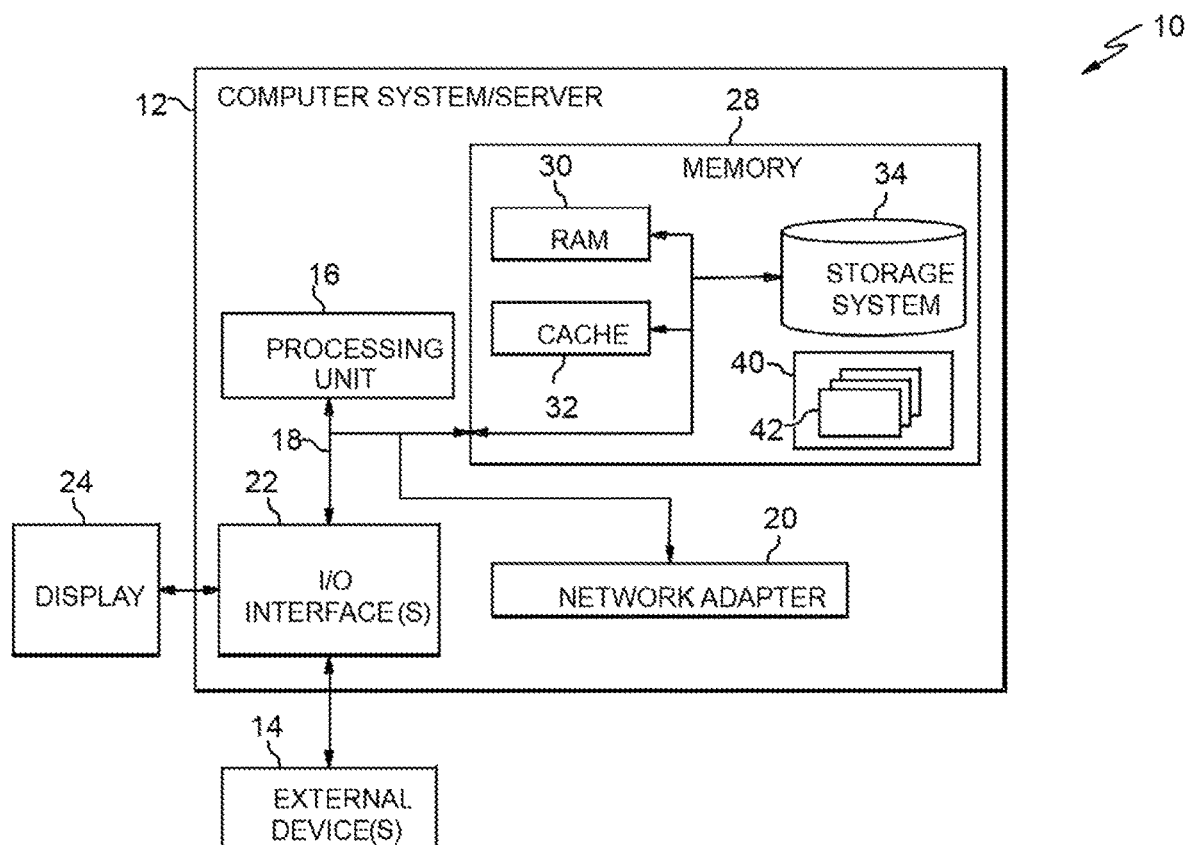
FIG. 1 depicts a cloud computing node according to an embodiment of the present invention.

Aspects of the present invention relate generally to data management and, more particularly, to creating a composite view of data that combines and compares data from multiple sources. According to aspects of the invention a master data management system with a physically materialized (persisted) entity and composite view is configured to propagate changes to the physically materialized entity back to the source records from which the entity was created. In embodiments, the ability to propagate changes to the physically materialized entity back to the source records from which the entity was created is enabled by maintaining the source records after the composite view has been created or updated. In this manner, implementations of the invention improve the speed at which the master data management system provides a composite view for a user while also allowing the source records to be updated and/or deleted.

In this disclosure, the terms silver record, member record, and source record are interchangeable and refer to data records from one or multiple data sources or systems. For simplicity and clarity, the term source record is used in this disclosure to mean a silver record, member record, or source record. A source record includes an instance of one or more attributes. Examples of attributes are first name, last name, date of birth, tax identification number, address, phone number, email address, etc. In this disclosure, source records are input for a matching function performed by a computer device to determine if the source records contain duplicate (and possibly somewhat conflicting) information (of an attribute, for example) which can be reconciled into a data record that is referred to, for example, as a golden record or entity. In this disclosure, the terms golden record and entity are interchangeable and refer to a record in a database or other data source that is derived from one or more source records where the source records are identified by a matching function of the computer device as being of sufficient similarity that they are considered as representing the same data. For simplicity and clarity, the term entity is used in this disclosure to mean a golden record or entity.

Implementations of the invention include a method for creating composite views in a master data management (MDM) system having different data source types. The method includes: defining composite rules based on a governance catalog like data quality metrics and/or regulatory metrics and/or metadata for the different data sources of the MDM system and/or data access policies; using the composite rules in a composite rule suggestion engine which could use a composite rules editor wherein the composite rules can be edited and approved over a graphical user interface (GUI) by a user; applying the approved composite rules to a matching engine wherein the matching engine receives data records via different API input/output channels from different data sources; displaying or using the matched data records in a graph store; and using the composite rules to compose a composed data record for the MDM system.

Implementations of the invention include a method for creating composite views in a master data management system having different data source types. The method includes using a configurator via a GUI by a MDM specialist/data expert to configure composite rules; requesting new composite rules with a composite rule editor; retrieving a list of sources attached to the MDM system from a governance catalog; retrieving an MDM model from the governance catalog; creating a mapping map in accordance with a matching algorithm that, for each semantically classified attribute in the MDM model, determines for all sources if there are one or multiple applicable attributes with the same semantical classification and, for each source, model how they are related to the semantically classified attributes of the MDM model; using the mapping map for each MDM attribute, retrieving for each linked source attribute data quality (DQ) scores (using for example, completeness, standardization, format, timeliness, etc.); ranking the source attributes linked to the MDM attribute in the mapping map based on a weighted DQ score; retrieving data access policies from the governance catalog; determining that any attribute not editable/viewable on the entity level by an end user is a candidate for propagation to the entity; providing a configuration in accordance with the matching algorithm to a composite view editor; reviewing and optionally updating a proposed rule set; and deploying the above to the MDM system.

Implementations of the invention include features that are not well-understood, routine, or conventional activity in the relevant art. For example, physically materializing a composite view in a MDM system while also preserving the source records is not well-understood, routine, or conventional. In addition, implementations of the invention are an improvement to the technological field of master data management in that an MDM system in accordance with embodiments of the invention provides the speed of a physical MDM system that physically materializes the composite view in the system while preserving the ability to edit source records. In addition, implementations of the invention improve the functioning of a computer by reducing the computing resources needed to produce a composite view in an MDM system (by physically materializing the composite view) that preserve editability of source records.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
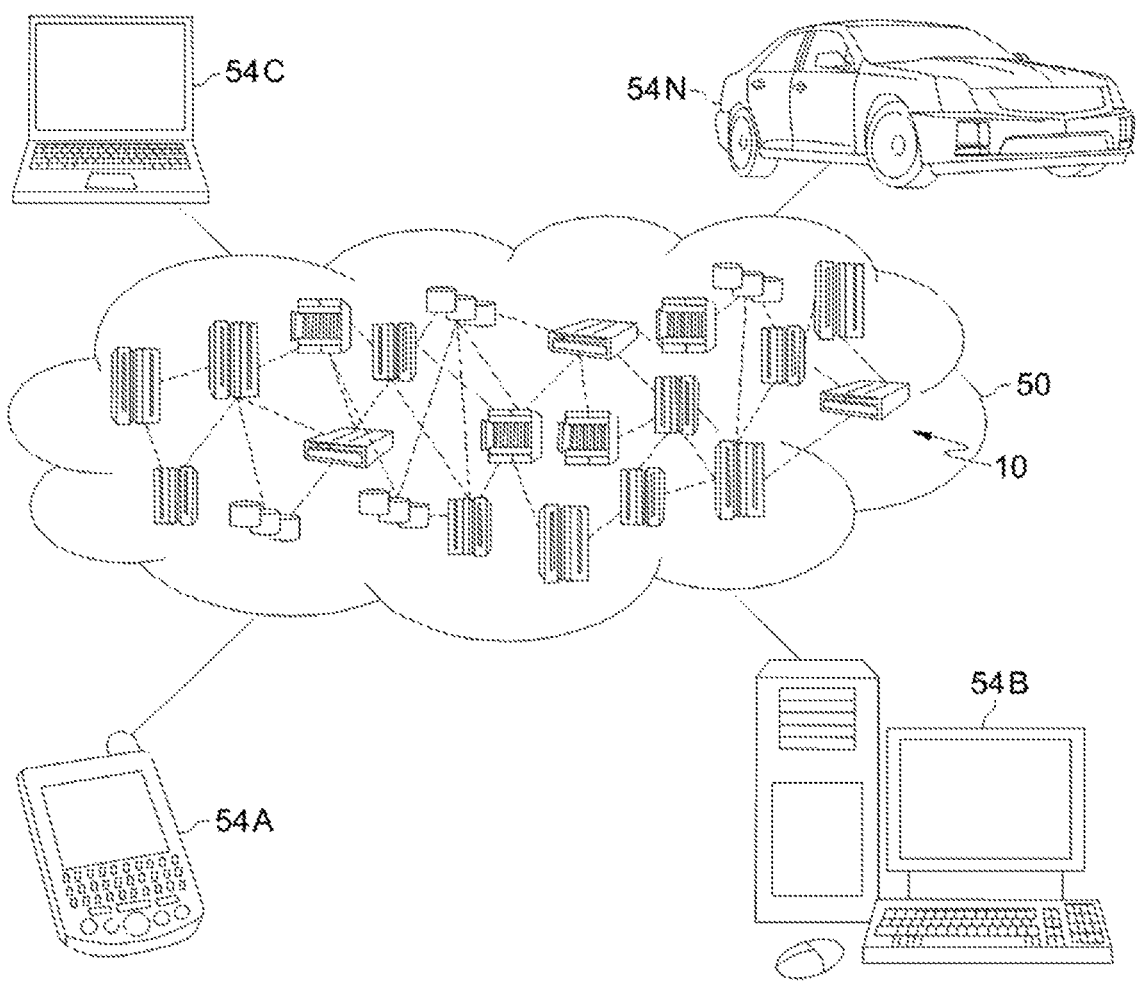
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
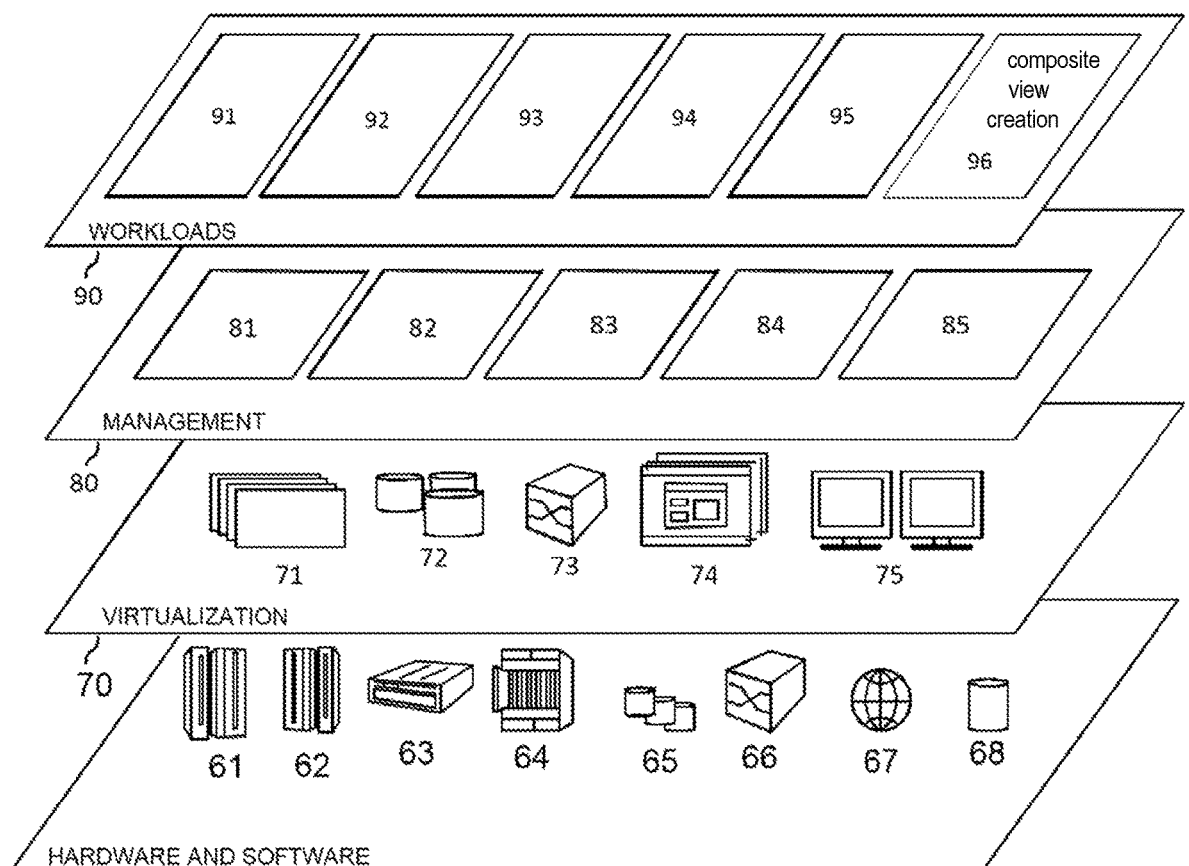
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and composite view creation 96.

Implementations of the invention may include a computer system/server 12 of FIG. 1 in which one or more of the program modules 42 are configured to perform (or cause the computer system/server 12 to perform) one of more functions of the composite view creation 96 of FIG. 3. For example, the one or more of the program modules 42 may be configured to: define initial composite rules based on a governance catalog; receive composite rule edits to the initial composite rules, the composite rule edits being input by a user; edit one or more of the initial composite rules in accordance with the composite rule edits to create edited composite rules; receive, in response to the editing, approval from the user of the edited composite rules; receive approval from the user of unedited ones of the initial composite rules; and establish the approved edited composite rules and the approved initial composite rules as the composite view rules.

To the extent implementations of the invention collect, store, or employ personal information provided by, or obtained from, individuals (for example, names, geographic addresses, telephone numbers, email addresses, other identifying information, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, the term matching refers to a function (performed on a computer device) that determines whether or not two or more source records contain a sufficient level of similarity to be considered as representing the same data. In cases where the matching operation determines that two or more source records are a match, the computer device reconciles the two or more source records to create, or update, an entity. In an auto-merge case in a physical MDM system, the entity is created (or updated) based on pre-defined survivorship rules on either an attribute or a record level, and once the entity is created (or updated), the input records are inactivated and all future updates can only be done on the entity.

Figure 4:
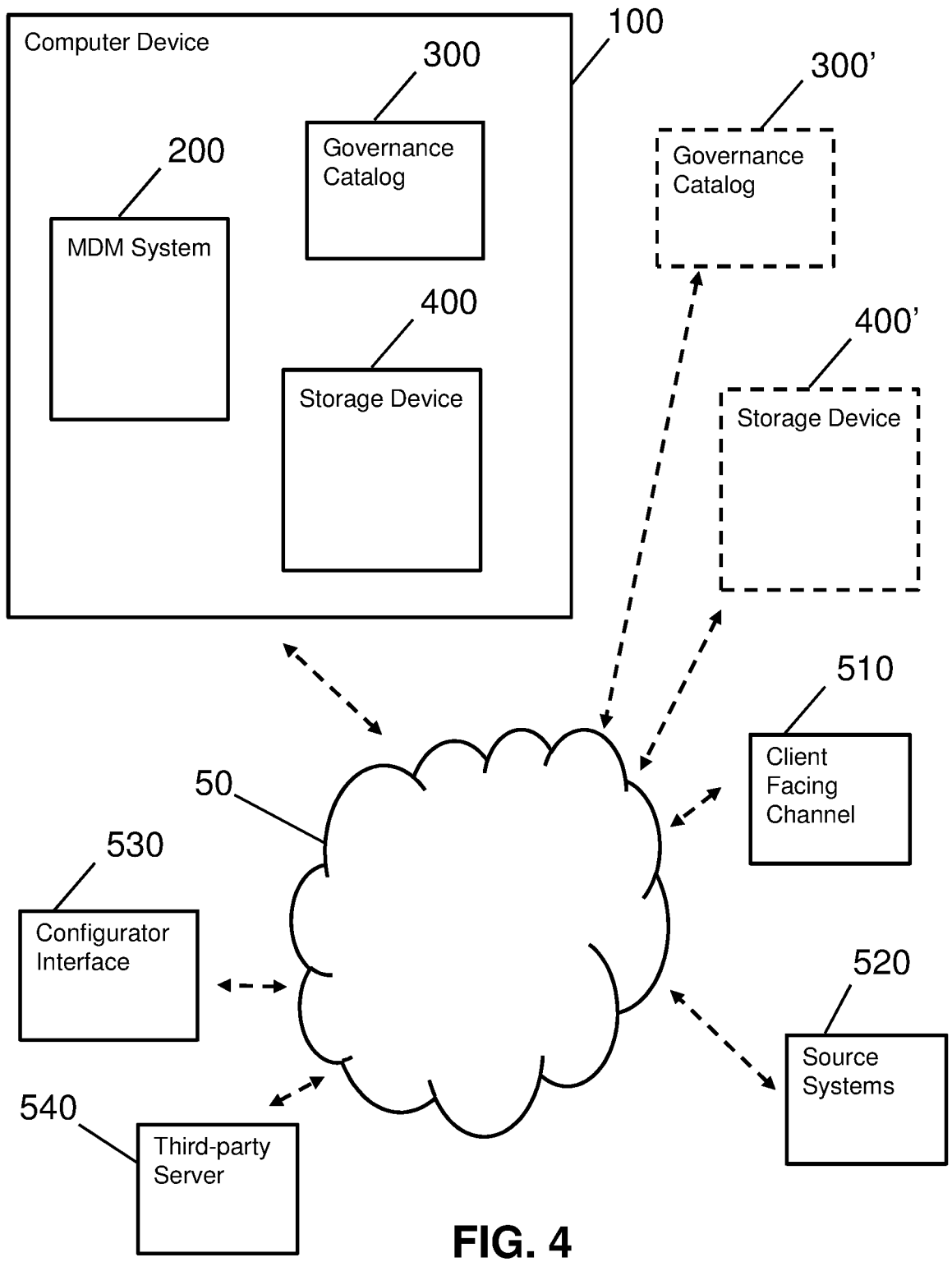
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1. Computer device 100 has a master data management (MDM) system 200, for example, one or more of program modules 42 in FIG. 1, a governance catalog 300, for example, one or more of program modules 42 in FIG. 1, and a storage device 400 such as, for example, storage system 34 in FIG. 1. In embodiments, governance catalog 300' and/or storage device 400' are located outside of computer device 100 and communicate through, for example, cloud computing environment 50. In embodiments, MDM system 200 includes a plurality of modules that perform various functions of MDM system 200. These modules are described in detail with reference to FIG. 5.

Computer device 100 communicates with one or more client facing channels 510 through, in this example, cloud computing environment 50. Examples of client facing channel 510 include computers, terminals, smart phones, tablets, and other devices through which a client accesses data managed by MDM system 200. In embodiments, one or more of client facing channels 510 are a part of computer device 100.

Computer device 100 communicates with one or more source systems 520 through, in this example, cloud computing environment 50. In embodiments, source systems 520 are databases or other sources of data from which computer device 100 receives source records from which MDM system 200 extracts data for use in the creation of a composite view. In embodiments, one or more of source systems 520 are a part of computer device 100.

Computer device 100 communicates with one or more configurator interfaces 530 through, in this example, cloud computing environment 50. In embodiments, configurator interfaces 530 are used by a configurator (for example, a human technician) to review and revise composite view rules, governance rules, data and other editable features of the MDM system. In embodiments, one or more of configurator interfaces 530 are a part of computer device 100.

Computer device 100 communicates with one or more third-party servers 540 through, in this example, cloud computing environment 50. In embodiments, third-party servers 540 contain third party source records that computer device 100 receives and from which MDM system 200 extracts data for use in the creation of a composite view. Examples of third-party servers 540 include public databases, subscription services (such as those providing financial or business data), and other data sources owned and/or operated by an organizational entity other than the organizational entity that owns and/or operates computer device 100.

In embodiments, some or all of the above communications take place over other wireless or wired networks or other communication systems instead of, or in addition to, cloud computing environment 50. For example, in embodiments, governance catalog 300' is located remotely from computer device 100 and communicates with computer device 100 over a wired network, while third-party server 540 communicates with computer device 100 over cloud computing environment 50.

Figure 5:
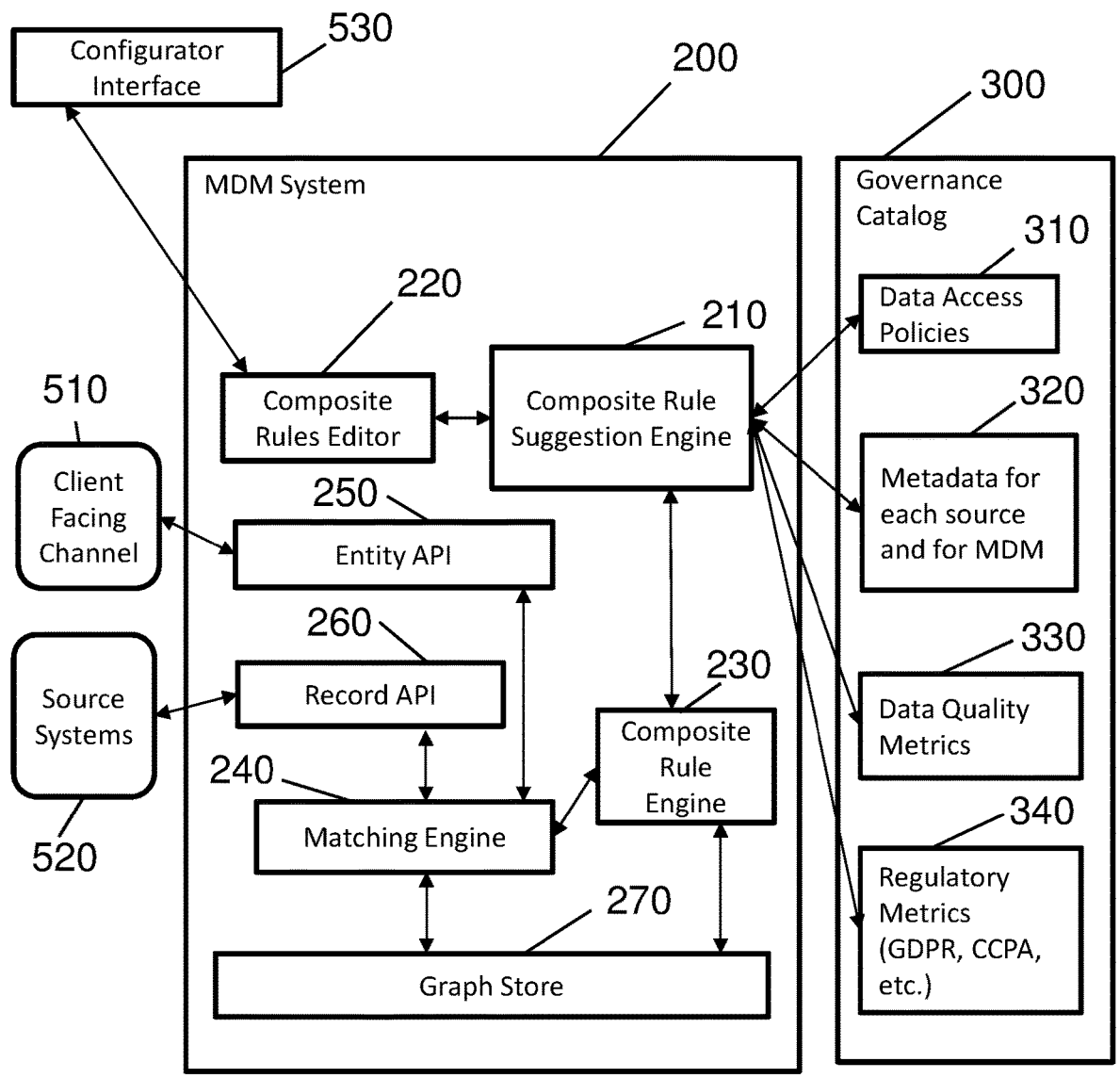
FIG. 5 shows a block diagram of an exemplary system in accordance with aspects of the invention.

FIG. 5 shows an exemplary embodiment of MDM system 200 in which MDM system 200 includes a plurality of components 210, 220, 230, 240, 250, 260, 270, each of which may comprise one or more of program modules 42 in FIG. 1. In this example, MDM system 200 includes a composite rule suggestion engine 210 that proposes one or more composite rules as a starting point for a rule configuration that will ultimately be executed by a composite rule engine (discussed below).

In embodiments, composite view rules are applied when constructing a composite view for an entity based on the entity's source records. In embodiments, a composite rule engine 230 (discussed below) processes the composite view rules, which have both a scope which determines which part of the model the rule applies to, as well as a rule type which defines what sort of logic to use for the rule. In embodiments, composite view rules are processed in order from most specific scope to least specific scope. An exemplary order of processing is: attribute scope (most specific)—applies to instances of a specified attribute; then attribute type scope—applies to instances of a specified attribute type; then record type scope—applies to instances of a specified record type; and then global (least specific)—applies to all data. In embodiments, rule types vary. In exemplary embodiments, rule types include: most current attribute—select the value(s) with the most recent data be used; most frequent attribute—select the value(s) that occur most frequently; source priority—select the value(s) based on an ordered list of sources to pick from; dynamic data quality (DQ) score—select the value(s) based on a dynamic scoring of the data from, for example, composite view suggestion engine 210.

In the example shown in FIG. 5, MDM system 200 includes a composite rule editor 220 that is used by a configurator (person) through configurator interface 530, for example, to review rules proposed by composite rule suggestion engine 210 and edit the proposed composite rules. A composite rule engine 230 deploys the composite rules (after any editing) and executes them. In embodiments, a composite rule configuration is comprised of one or multiple rules.

In the example shown in FIG. 5, MDM system 200 includes a composite rule engine 230. In embodiments, composite rule engine 230 performs two functions. One function of composite rule engine 230 is to construct the consolidated view for an entity from the source records that supply the data for creating (or editing) that entity. Another function of composite rule engine 230 is to propagate changes made to a composited entity back to the source records from which the entity was created (or edited).

In embodiments, composite rule engine 230 constructs the composite view from source records by processing instances of each attribute in source records until a single value for each attribute is obtained. To do this, composite rule engine 230 applies the composite view rules applicable for each attribute to filter the values down to a single instance. Rule processing stops for each attribute when composite rule engine 230 has obtained a single value for that attribute. In embodiments, when no single value can be obtained from the specified rules, composite rule engine 230 uses an internal identifier (such as, for example, most recent source record creation/update date, most trusted database, etc.) to determine which value is to be used.

Figure 6:
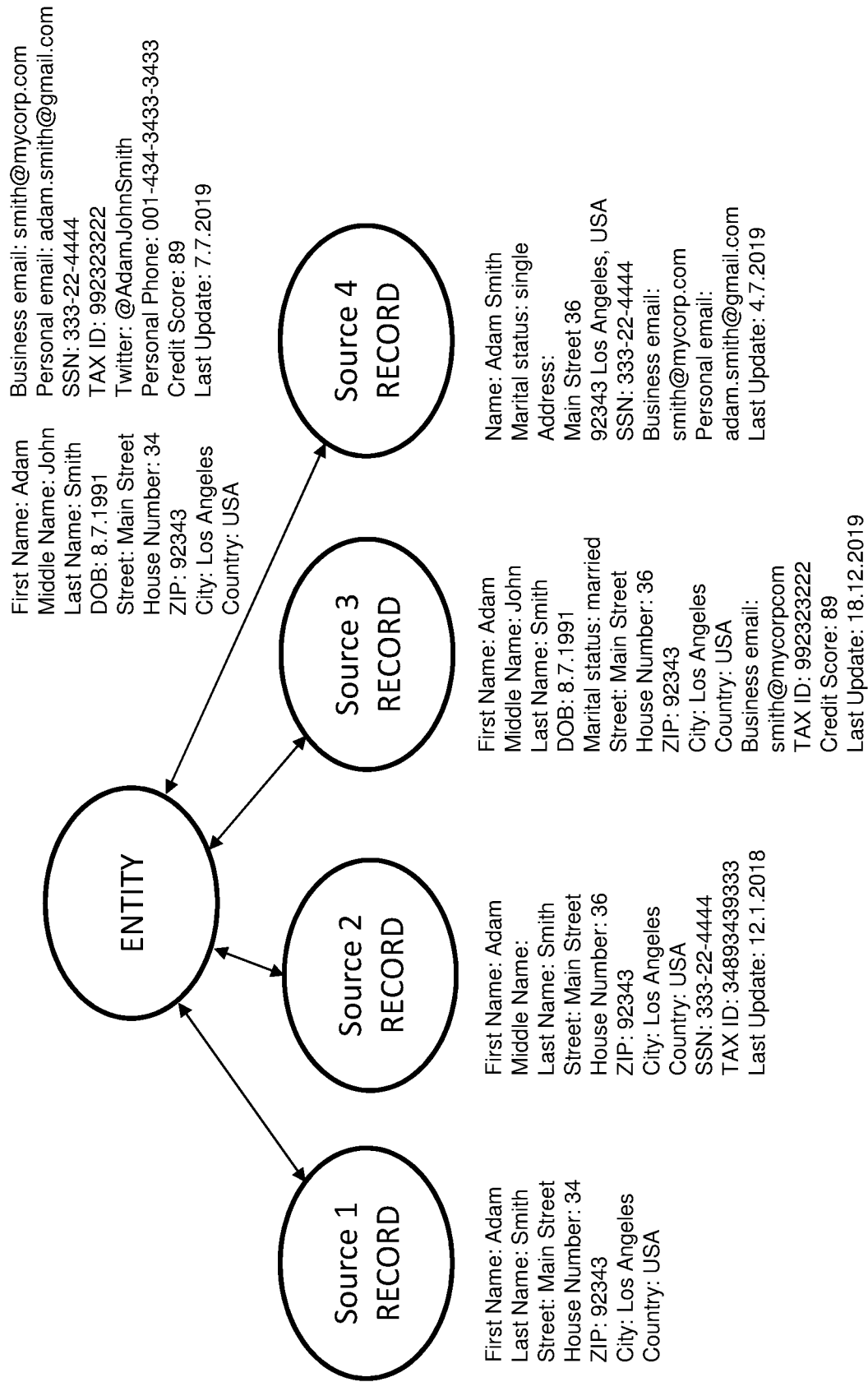
FIG. 6 shows a block diagram of exemplary source records and an exemplary entity in accordance with aspects of the invention.

FIG. 6 shows an example of four source records that are processed by composite rule engine 230 to produce a composite view. In this example, the record from Source 1 has a value of "Adam" for the attribute "First Name", the record from Source 2 has a value of "Adam" for the attribute "First Name", the record from Source 3 has a value of "Adam" for the attribute "First Name", and the record from Source 4 has a value of "Adam Smith" for the attribute "Name". Composite rule engine 230 applies composite view rules that determine that the attribute "First Name" in the entity should have a value of "Adam" because three of the four sources have "Adam" as the value of the entity "First Name". In this example, the composite view rule uses the value in the majority of source records as the value used in the entity. In the example shown in FIG. 6, the record from Source 1 has a value of "34" for the attribute "House Number", the record from Source 2 has a value of "36" for the attribute "House Number", the record from Source 3 has a value of "36" for the attribute "House Number", and the record from Source 4 has a value of "Main Street 36 92343 Los Angeles, USA" for the attribute "Address". Composite rule engine 230 applies composite view rules that determine that the attribute "House Number" in the composite view should have a value of "34" because Source 1 is given a higher priority than the other three sources. In this example, the composite view rule uses the value in the source record of the source that is most trusted as the value used in the composite view. In embodiments, other factors are considered in determining the value of attributes used in the composite view. Examples of such factors are shown in FIGS. 8-10 and are discussed below with reference to those figures.

In embodiments, composite rule engine 230 propagates changes made to an entity back to the entity's source records by processing each change made to the entity and determining which source records are to be updated. The scope of the change determines which source records are updated. For example, composite rule engine 230 propagates a change to the first name attribute of the entity to the source records that have an attribute "first name" or an attribute "name" that includes a first name. As an example, one source record has "John" as the first name attribute, and a second source record has "Jon Smith" as the name attribute. In this example, after composite rule engine 230 determines (from the composite rules) that "John" is the single value used in the entity, composite rule engine 230 propagates "John Smith" to replace "Jon Smith" in the second source record.

In embodiments, composite rule engine 230 applies composite view entity modification rules when propagating changes to an entity to the entity's source records. A composite view entity modification rule that is processed by composite rule engine 230 has a scope which determines which part of the model the rule applies to, as well as a rule expression which defines which records the rule gets applied to. In embodiments, composite view entity modification rules are processed in order from most specific scope to least specific scope. An exemplary order of processing is: attribute scope (most specific)—applies to instances of a specified attribute; then attribute type scope—applies to instances of a specified attribute type; then record type scope—applies to instances of a specified record type; and then global (least specific)—applies to all data. In embodiments, rule expressions are used to determine which records a particular composite view entity modification rule should apply to. Composite view entity modification rules with expressions that return false are skipped for the specified user record. Exemplary rule expressions include: to apply the change to only one or more specified source systems; to apply the change based on the value of some other data in the record; and more complex logical combinations of expressions. Composite view entity modification rules also have a precedence setting that determines what should occur when record updates are made after a conflicting change has been made to an associated entity. In embodiments, the composite view entity modification rule is set to give precedence to the source record, the entity, or the most current value.

In the example shown in FIG. 5, MDM system 200 includes a matching engine 240 that determines whether two source records are sufficiently similar to be considered as representing the same data and should be reconciled.

In the example shown in FIG. 5, MDM system 200 includes an entity application programming interface (API) 250 that is an interface between various types of client facing channels 510 and matching engine 240. An example of entity API 250 is a representational state transfer (REST) API. In embodiments, other types of APIs are used as entity API 250.

In the example shown in FIG. 5, MDM system 200 includes a record API 260 that is an interface between various types of source systems 520 and matching engine 240. An example of record API 260 is a representational state transfer (REST) API. In embodiments, other types of APIs are used as record API 260.

In the example shown in FIG. 5, MDM system 200 includes a graph store 270 which is, in this example, a graph database. In embodiments, graph store 270 stores a data model in graph form for each business object (person, org, product, location, etc.) where matching is applicable. The graph model has two types of vertices: an entity vertex which represents the entity (or golden record) view; and a record vertex which represents the source record (or silver record) view. Entity API 250 operates on the entity vertices of the graph models. Record API 260 operates on the record vertices of the graph models.

FIG. 5 shows an exemplary embodiment of governance catalog 300 in which governance catalog 300 includes a plurality of modules, for example, one or more of program modules 42 in FIG. 1. Governance catalog 300 includes various information and policies that govern rules suggested by composite rule suggestion engine 210. In this example, governance catalog 300 includes data access policies 310 that determine what information MDM system 200 is permitted to read from and write to particular source records, and what information MDM system 200 is only permitted to read from, but not write to, the particular source records. For example, a particular source designates a "Tax ID" attribute as read-only and, as a result, composite rule suggestion engine 210 includes only read instructions (and not write instructions) in rules that involve the "Tax ID" attribute in that particular source.

Figure 7:
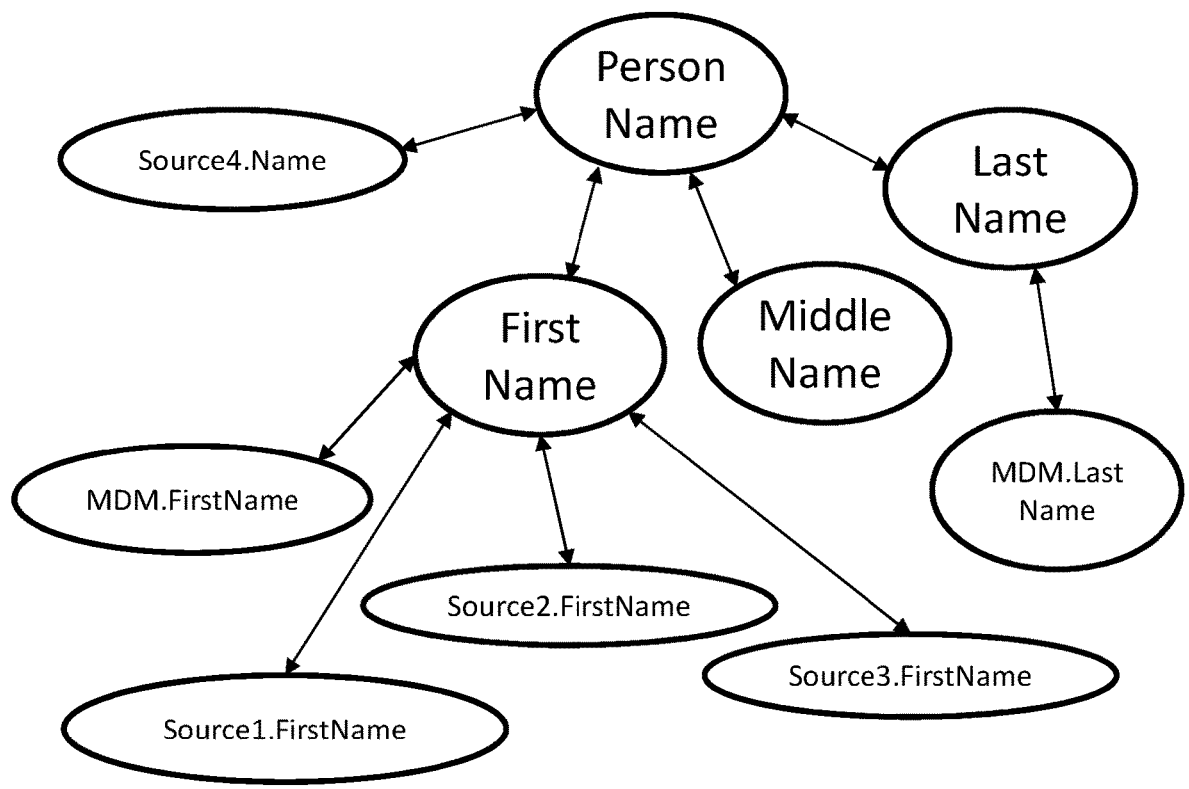
FIG. 7 shows an example of metadata from a guidance catalog in accordance with aspects of the invention.

In the example shown in FIG. 5, governance catalog 300 includes metadata 320 that, in this example, includes metadata for sources accessed by MDM system 200. FIG. 7 shows an example of how composite rule suggestion engine 210 considers metadata when generating proposed composite rules. In the example shown in FIG. 7, four pieces of data have metadata (".FirstName") that indicates that the data is associated with the attribute "First Name". As a result, a rule proposed by composite rule suggestion engine 210 states that data from source records that use ".FirstName" for an attribute will be considered when composite rule engine 230 determines the value of the First Name attribute of the composite view. Other examples of metadata used include: data types, filed length, constraints, default values, priority indicators, etc.

In the example shown in FIG. 5, governance catalog 300 includes data quality metrics 330 that composite rule suggestion engine 210 considers when generating proposed composite rules. FIG. 8 shows an example of data quality metrics in which a Total Data Quality (DQ) Score is calculated for attributes of sources (source attributes). In this example, the Total DQ Score for the First Name attribute of Source 1 is shown 1.942, which is calculated as follows: 1*0.98 (completeness)+1*0.96 (format)+1*0.002 (cardinality)+1*0 (domain compliance)+1*0 (standardization)+1*0 (address verification)=1.942. Other embodiments use other factors and/or weigh the factors differently. In this example, composite rule suggestion engine 210 develops a composite rule that considers the value of the source attribute with the highest DQ score (indicated by an * to the right of the table) as the highest quality value for that attribute. In embodiments, the highest quality value determination is one factor that composite rule suggestion engine 210 considers when proposing a composite rule.

FIGS. 9 and 10 show examples of mapping maps used by matching engine 240 to determine which sources have attributes that match the attributes in an MDM model (MDM attributes). The MDM model is a model for the entity. FIG. 9 shows which sources contain values for the various MDM attributes. For example, Source 1 does not have a value for the MDM attribute Middle Name. FIG. 10 shows the mapping map of FIG. 9 after composite rule engine 230 applies DQ scores (calculated in FIG. 8, for example) to determine a ranking of the attributes across the sources. In this example, the value of the attribute City from Source 4 will be used because it is ranked number 1 among the sources.

In the example shown in FIG. 5, governance catalog 300 includes regulatory metrics 340. In this example, regulatory metrics 340 include General Data Protection Regulation (GDPR), California Consumer Privacy Act (CCPA), and other information that is used by MDM system 200 to govern what data is included in the creation of a composite view. Various regulatory metrics limit what attributes are included in particular composite views. For example, the CCPA, or some other regulation, might prohibit the use of social security numbers in views that are available to the general public.

The example shown in FIG. 5 is just one example of MDM system 200 and governance catalog 300. Other examples of MDM system 200 and governance catalog 300 include fewer or more modules than the example shown in FIG. 5.

Figure 11:
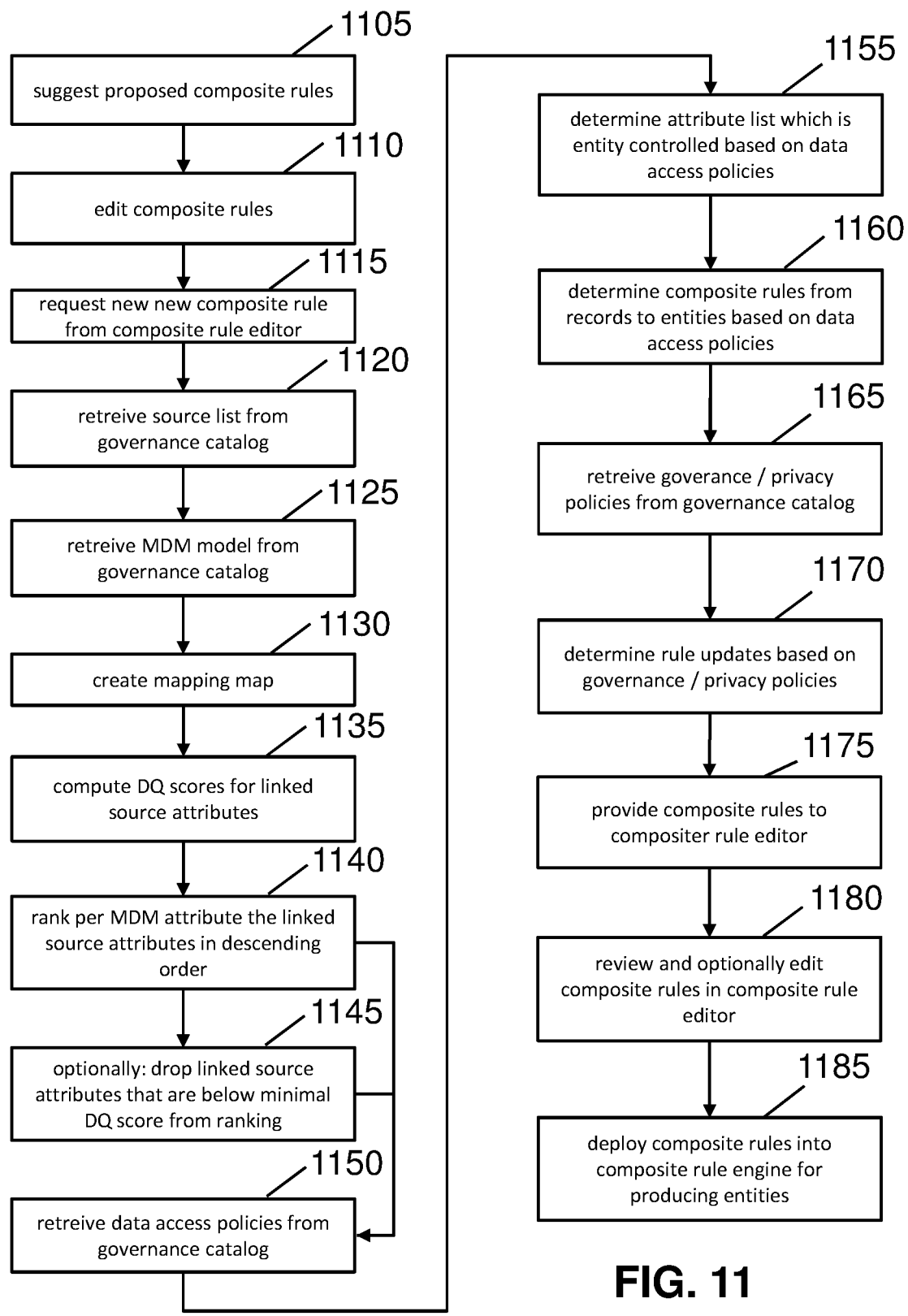
FIG. 11 shows a flowchart of an exemplary method in accordance with aspects of the invention.

FIG. 11 shows a flowchart of an exemplary method in accordance with aspects of the present invention. Steps of the method may be carried out in the environment of FIG. 4 and are described with reference to elements depicted in FIG. 4.

At step 1105, composite rule suggestion engine 210 creates and suggests proposed composite view rules. For example, composite rule suggestion engine 210 suggests composite view rules that consider the data duality scoring shown in FIG. 8

At step 1110, an MDM specialist/data expert reviews and edits the proposed composite view rules produced by composite rule suggestion engine 210. For example, MDM specialist/data expert edits weights applied to particular factors in the calculation of the DQ score. At step 1115, the MDM specialist/data expert requests composite rule editor 220 to produce a new composite rule based on the edits performed by the MDM specialist/data expert. For example, composite rule editor 220 receives a request from the MDM specialist/data expert through configurator interface 530.

At step 1120, composite rule suggestion engine 210 retrieves a list of sources attached to MDM system 200 from governance catalog 300. In embodiments, governance catalog 300 includes a list of sources (for example, source systems 520) from which data can be accessed. At step 1125, composite rule suggestion engine 210 retrieves the MDM model from governance catalog 300. In embodiments, the MDM model includes the MDM attributes (see FIG. 9) that composite rule suggestion engine 210 uses in creating a mapping map.

At step 1130, composite rule suggestion engine 210 creates a mapping map in accordance with a matching algorithm. For example, in embodiments, the matching algorithm determines (for each semantically classified attribute in the MDM model, and for all sources) a linked source attribute for each of the semantically classified attributes in the MDM model where there is an attribute from the sources with a same semantical classification. At step 1135, composite rule suggestion engine 210 computes DQ scores computed for each linked source attribute. For example, composite rule suggestion engine 210 retrieves the DQ scores calculated as shown in FIG. 8.

At step 1140, composite rule engine 230 ranks the source attributes linked to the MDM attribute in the mapping map based on a weighted DQ score. For example, as shown in FIG. 10, composite rule engine 230 ranks the Last Name attribute of Source 3 as the highest ranked.

At step 1145, in embodiments, if the ranked weighted DQ score is below a minimum quality threshold, composite rule engine 230 ignores that attribute as a candidate which can update the entity. For example, as shown in FIG. 8, the minimum DQ threshold score for the House Number attribute is 4, and as a result, only data from Source 1 is used to select the value of the House Number MDM attribute (see also the discussion reading FIG. 6).

At step 1150, composite rule suggestion engine 210 retrieves data access policies from governance catalog 300. For example, composite rule suggestion engine 210 retrieves access policies governing what attributes are read only at the source record level. At step 1155, composite rule suggestion engine 210 determines which attributes are editable by an end user at the entity level, and determines whether those attributes are to be propagated from the source record to the entity. For example, in embodiments, any attribute that is not editable/viewable at the entity level by an end user (based on data access policies 310) is a candidate for propagation directly to the entity. In embodiments, any attribute editable by the end user is an attribute not to be propagated directly from the source record to entity.

At step 1160, composite rule suggestion engine 210 determines composite rules from records to entities based on data access policies. For example, composite rule suggestion engine 210 determines a composite rule that dictates what data from the source records is propagated from the source records to entities by considering, for example, access policies 310 from governance catalog 300. At step 1165, composite rule suggestion engine 210 retrieves governance polices from governance catalog 300. For example, composite rule suggestion engine 210 retrieves privacy policies in accordance with the CCPA from regulatory metrics 340.

At step 1170, composite rule suggestion engine 210 determines composite rule updates based on the governance policies retrieved in step 1165. For example, in embodiments, composite rule suggestion engine 210 excludes particular data (such as, for example, tax ID numbers) based on provisions in the CCPA. At step 1175, composite rule suggestion engine 210 provides the updates from step 1170 to composite rule editor 220.

At step 1180, the MDM specialist/data expert reviews, optionally updates, and approves the proposed composite rules. For example, the MDM specialist/data expert views and edits the composite rules in composite rule editor 220 through configurator interface 530. At step 1185, composite rule suggestion engine 210 deploys the composite rules approved by the MDM specialist/data expert at step 1180 to composite rule engine 230 for producing composite views. For example, the composite rules approved by the MDM specialist/data expert at step 1180 are electronically transferred from composite rule suggestion engine 210 to composite rule engine 230 for use to produce composite views (as described in detail in reference to FIG. 5 and composite rule engine 230, above).

Figure 12:
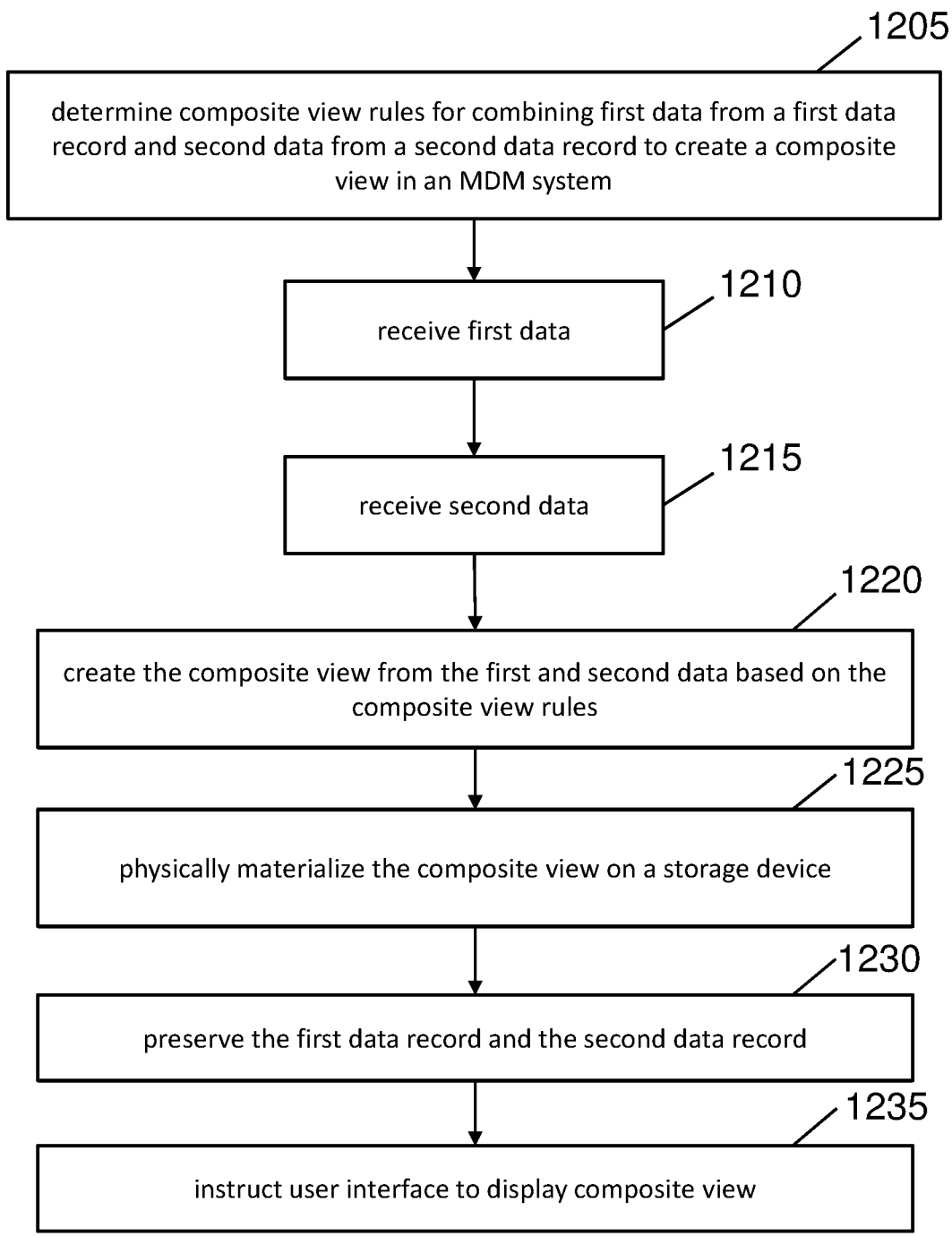
FIG. 12 shows a flowchart of an exemplary method in accordance with aspects of the invention.

FIG. 12 shows a flowchart of an exemplary method in accordance with aspects of the present invention. Steps of the method may be carried out in the environment of FIG. 4 and are described with reference to elements depicted in FIG. 4.

At step 1205, composite rule suggestion engine 210 determines composite view rules for combining first data from a first data record and second data from a second data record to create a composite view of an entity in MDM system 200. In embodiments, composite rule suggestion engine 210 uses data access policies 310 and other governance parameters from governance catalog 300 to determine the composite view rules to be used by MDM system 200 to create composite views. In embodiments, composite rule suggestion engine 210 determines the composite view rules by: defining initial composite rules based on governance catalog 300; receiving composite rule edits to the initial composite rules from composite rules editor 220, the composite rule edits being input by a user through configurator interface 530; editing one or more of the initial composite rules in accordance with the composite rule edits to create edited composite rules; receiving, in response to the editing, approval from the user (through configurator interface 530) of the edited composite rules; receiving approval from the user (through configurator interface 530) of unedited ones of the initial composite rules; and establishing the approved edited composite rules and the approved initial composite rules as the composite view rules. In embodiments, composite rule suggestion engine 210 determines the composite view rules based on governing rules in governance catalog 300. In embodiments, the governing rules include data access policies 310, data quality metrics 330, and/or regulatory metrics 340. In embodiments, the entities and composite rules in the MDM system are materialized on a storage device such as, for example, graph store 270 that stores the entities in a graph model.

At step 1210, MDM system 200, through record API 260, receives the first data used in step 1205. In embodiments, the first data is part of a first data record from a customer database. At step 1215, MDM system 200, through record API 260, receives the second data used in step 1205. In embodiments, the second data is part of a second data record from a third-party subscription service that contains credit history data.

At step 1220, MDM system 200, for example composite rule engine 230, creates a composite view from the first and second data based on the composite view rules. In embodiments, composite rule engine 230 creates a composite view in MDM system 200 that contains the name, address, tax ID number, email address, and date of birth from the customer database (the first data), and the name, tax ID number, and credit score (the second date) from the third-party subscription service.

At step 1225, MDM system 200, for example composite rule engine 230, physically materializes the composite view on a storage device. In embodiments, the composite view that is created by composite rule engine 230 is stored on storage device 400.

At step 1230, composite rule engine 230 preserves the first data record and the second data record. In embodiments, composite rule engine 230 stores the first data record and the second data record in storage device 400 so that the first data record and the second data record are accessible when MDM system 200 propagates changes to the entity back to the first and second record.

At step 1235, MDM system 200 instructs a user interface to display the composite view. In embodiments, entity API 250 sends appropriate instructions to a user interface such as client facing channel 510 to display the composite view. In embodiments, client facing channel 510 is a computer monitor, smart phone, tablet, or other display.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, by a computer device, composite view rules for combining first data from a first data record and second data from a second data record to create a composite view of an entity in a master data management system;
    receiving, by the computer device, the first data;
    receiving, by the computer device, the second data;
    creating, by the computer device, a reconciled version of an attribute by reconciling a portion of the first data and a conflicting portion of the second data;
    creating, by the computer device, the composite view from the first data and the second data based on the composite view rules, the composite view including the reconciled version of the attribute;
    physically materializing, by the computer device, the composite view on a storage device;
    preserving, by the computer device, the first data record; and
    preserving, by the computer device, the second data record.

2. The computer-implemented method of claim 1, further comprising:
    determining, by the computer device, that a change to the entity corresponds to the first data record; and
    propagating, by the computer device, the change to the entity back to the first data record.

3. The computer-implemented method of claim 1, wherein the determining the composite view rules further comprises:
    defining, by the computer device, initial composite rules based on a governance catalog;
    receiving, by the computer device, composite rule edits to the initial composite rules, the composite rule edits being inputted by a user;
    editing, by the computer device, one or more of the initial composite rules in accordance with the composite rule edits to create edited composite rules;
    receiving, by the computer device and in response to the editing, approval from the user of the edited composite rules;
    receiving, by the computer device, approval from the user of unedited ones of the initial composite rules; and
    establishing, by the computer device, the approved edited composite rules and the approved initial composite rules as the composite view rules.

4. The computer-implemented method of claim 1, wherein the determining the composite view rules is based on governing rules.

5. The computer-implemented method of claim 4, wherein the governing rules comprise at least one selected from the group consisting of:
    data access policies;
    data quality metrics; and
    regulatory metrics.

6. The computer-implemented method of claim 1, wherein
    the first data record is a record in a first database,
    the second data record is a record in a second database, and
    the second database and the first database are different databases.

7. The computer-implemented method of claim 1, further comprising removing, by the computer device, the second data from the composite view.

8. The computer-implemented method of claim 1, wherein the storage device is a graph store that stores the composite view in a graph model.

9. The computer-implemented method of claim 1, further comprising receiving, by the computer device, input from a user through a user interface,
    wherein the input is a change to the composite view rules.

10. The computer-implemented method of claim 1, further comprising instructing, by the computer device, a user interface to display the composite view.

11. The computer-implemented method of claim 1, further comprising receiving, by the computer device, a source list from a governance catalog,
    wherein the first data is from a first source on the source list, and
    the second data is from a second source on the source list.

12. The computer-implemented method of claim 1, wherein the computer device includes software provided as a service in a cloud computing environment.

13. A computer program product, the computer program product comprising a computer readable storage medium having program instructions embodied therewith, the program instructions executable by a computing device to cause the computing device to:
    determine composite view rules for combining first data from a first data record and second data from a second data record to create a composite view of an entity in a master data management system;
    receive the first data;
    receive the second data;
    create a reconciled version of an attribute by reconciling a portion of the first data and a conflicting portion of the second data;
    create the composite view from the first data and the second data based on the composite view rules, the composite view including the reconciled version of the attribute;

physically materialize the composite view on a storage device;
preserve the first data record; and
preserve the second data record.

14. The computer program product of claim 13, further comprising program instructions executable by the computing device to:
determine that a change to the entity corresponds to the first data record; and
propagate the change to the entity back to the first data record.

15. The computer program product of claim 13, further comprising program instructions executable by the computing device to:
receive a change to the first data record; and
update the composite view to reflect the change to the first record,
wherein the determining the composite view rules is based on governing rules, and
the governing rules comprise at least one selected from the group consisting of: data access policies; data quality metrics; and regulatory metrics.

16. A system comprising:
a processor, a computer readable memory, and a computer readable storage medium;
program instructions to determine composite view rules for combining first data from a first data record and second data from a second data record to create a composite view in a master data management system;
program instructions to receive the first data;
program instructions to receive the second data;
program instructions to create a reconciled version of an attribute by reconciling a portion of the first data and a conflicting portion of the second data;
program instructions to create the composite view from the first data and the second data based on the composite view rules, the composite view including the reconciled version of the attribute;
program instructions to materialize the composite view on a storage device;
program instructions to preserve the first data record; and
program instructions to preserve the second data record,
wherein the program instructions are stored on the computer readable storage medium for execution by the processor via the computer readable memory.

17. The system of claim 16, wherein the determining the composite view rules is based on governing rules, the governing rules being processed in the order of:
rules that apply to instances of a specified attribute;
rules that apply to instances of a specified attribute type;
rules that apply to instances of a specified record type; and
rules that apply to all data.

18. The system of claim 17, wherein the governing rules comprise at least one selected from the group consisting of:
data access policies;
data quality metrics; and
regulatory metrics.

19. The system of claim 16, further comprising program instructions to:
receive a change to the entity; and
change the composite view based on the change to the entity.

20. The system of claim 19, further comprising program instructions to:
receive a change to the first data record; and
update the composite view to reflect the change to the first data record.

21. A computer-implemented method comprising:
defining, by a computer device, initial composite rules based on a governance catalog;
editing, by the computer device, one or more of the initial composite rules in accordance with composite rule edits to create edited composite rules;
receiving, by the computer device, source data records from two different data sources;
creating, by the computer device, a reconciled version of an attribute by reconciling a portion of first data of the source data records received from one of the two different data sources and a conflicting portion of second data of the source data records received from another of the two different data sources;
creating, by the computer device, a composite view in a master data management system by applying the edited composite rules and unedited ones of the initial composite rules to the first data and the second data from the source data records, the composite view including the reconciled version of the attribute;
physically materializing, by the computer device, the composite view on a storage device; and
preserving, by the computer device, the source data records.

22. The computer-implemented method of claim 21, wherein the storage device is a graph store.

23. The computer-implemented method of claim 21, wherein the governance catalog comprises at least one selected from the group consisting of:
data quality metrics;
regulatory metrics;
metadata of the different data sources; and
data access policies.

24. The computer-implemented method of claim 21, wherein the computer device receives the source data records via different API input/output channels from the different data sources.

25. A computer-implemented method comprising:
suggesting, by a computer device, proposed composite rules for a master data management (MDM) system;
editing, by the computer device, the proposed composite view rules;
retrieving, by the computer device, a list of sources attached to the MDM system from a governance catalog;
retrieving, by the computer device, an MDM model from the governance catalog, the MDM model having semantically classified attributes;
creating, by the computer device, a mapping map in accordance with a matching algorithm, the matching algorithm determining a linked source attribute for each of the semantically classified attributes in the MDM model where there is an attribute from the sources with a same semantical classification;
computing, by the computer device and using the mapping map, a data quality score for each linked source attribute;
ranking, by the computer device, the linked source attributes based on the data quality scores;
retrieving, by the computer device, data access policies from the governance catalog;
determining, by the computer device, composite rules based on the data access policies; and
deploying, by the computer device, the composite rules for use in producing composite views in the MDM system.

* * * * *